United States Patent
Hermansson

(10) Patent No.: US 9,494,228 B2
(45) Date of Patent: Nov. 15, 2016

(54) SHIFTER ASSEMBLY

(75) Inventor: Bengt Hermansson, Mullsjö (SE)

(73) Assignee: Kongsberg Automotive AB, Mullsjö (SE)

( * ) Notice: Subject to any disclaimer, the term of this patent is extended or adjusted under 35 U.S.C. 154(b) by 133 days.

(21) Appl. No.: 14/359,738

(22) PCT Filed: Nov. 21, 2011

(86) PCT No.: PCT/IB2011/002762
§ 371 (c)(1),
(2), (4) Date: May 21, 2014

(87) PCT Pub. No.: WO2013/076517
PCT Pub. Date: May 30, 2013

(65) Prior Publication Data
US 2014/0338488 A1    Nov. 20, 2014

(51) Int. Cl.
*F16H 59/02*    (2006.01)
*F16H 59/10*    (2006.01)
(Continued)

(52) U.S. Cl.
CPC ........ *F16H 59/105* (2013.01); *F16H 59/0204* (2013.01); *F16H 59/08* (2013.01);
(Continued)

(58) Field of Classification Search
CPC ........... F16H 59/0204; F16H 59/0221; F16H 59/006; F16H 59/081; F16H 59/0239; F16H 61/24; F16H 59/105; F16H 59/08; F16H 59/0278; F16H 2059/0239; F16H 2059/006; F16H 2059/0221; F16H 2059/081; F16H 2059/0295; G05G 9/10; G05G 2009/04781; G05G 2009/04785; G05G 2009/04792
USPC ........... 74/473.33, 473.3, 471 XY, 485, 469, 74/471 R, 473.1, 473.21, 473.24, 473.25, 74/473.26, 473.28
See application file for complete search history.

(56) References Cited

U.S. PATENT DOCUMENTS 5,161,422 A    11/1992 Suman
5,791,197 A  *  8/1998 Rempinski .......... F16H 59/0204
                                                            74/473.18
(Continued)

FOREIGN PATENT DOCUMENTS

DE    19754250      *  6/1998  ............. F16H 59/10
DE    19754250 A1  *  6/1998  ............. B60K 37/06
(Continued)

OTHER PUBLICATIONS

International Search Report dated May 30, 2013 for PCT/IB2011/002762.
(Continued)

*Primary Examiner* — William C Joyce
*Assistant Examiner* — Joseph Brown
(74) *Attorney, Agent, or Firm* — Howard & Howard Attorneys PLLC

(57) ABSTRACT

A shifter assembly (20) for a transmission of a vehicle. The shifter assembly includes a shaft (36) defining a longitudinal axis (LA) and having a knob (42) mounted to a first end (38) of the shaft. A selector plate (46) is mounted to a second end (40) of the shaft. The selector plate is movable as a unit with the shaft. The shifter assembly includes a guide plate (54) coupled to the housing (24). The guide plate defines a first path (56) and a second path (58) spaced from the first path. A portion (52) of the selector plate is movable through the first path during an automatic mode for facilitating automatic selection of the gear positions within the transmission. The selector plate is rotatable about the longitudinal axis into a manual mode. In the manual mode, the portion of the selector plate is movable through the second path for permitting manual selection of gear positions within the transmission.

20 Claims, 6 Drawing Sheets

(51) Int. Cl.
*F16H 61/24* (2006.01)
*F16H 59/04* (2006.01)
*F16H 59/08* (2006.01)

(52) U.S. Cl.
CPC ............. *F16H 59/10* (2013.01); *F16H 61/24* (2013.01); *F16H 2059/0239* (2013.01); *F16H 2059/047* (2013.01); *F16H 2059/081* (2013.01); *F16H 2061/242* (2013.01); *F16H 2061/243* (2013.01); *Y10T 74/2014* (2015.01)

(56) References Cited

U.S. PATENT DOCUMENTS

| | | | |
|---|---|---|---|
| 5,852,953 A | 12/1998 | Ersoy | |
| 5,861,803 A | 1/1999 | Issa | |
| 6,082,213 A * | 7/2000 | Skogward | F16H 59/0204 74/473.12 |
| 6,415,677 B1 | 7/2002 | Skogward | |
| 6,448,670 B1 | 9/2002 | Onodera | |
| 6,848,332 B2 | 2/2005 | Hayashi | |
| 7,069,807 B2 * | 7/2006 | Girlando | F16H 63/38 74/473.18 |
| 7,201,077 B2 * | 4/2007 | Yamamoto | F16H 63/42 116/28.1 |
| 7,472,621 B2 * | 1/2009 | Syamoto | F16H 59/0204 74/473.18 |
| 7,571,662 B2 * | 8/2009 | Pickering | B60K 37/06 200/61.88 |
| 7,640,823 B2 * | 1/2010 | Bowman | F16H 59/0204 74/471 XY |
| 7,698,965 B2 | 4/2010 | Ehrlich | |
| 8,686,717 B2 * | 4/2014 | Wang | G01B 7/003 324/207.11 |
| 2007/0101819 A1 | 5/2007 | Kerber | |
| 2007/0261509 A1 | 11/2007 | Meyer | |
| 2008/0006113 A1 * | 1/2008 | Matsui | F16H 59/105 74/473.1 |

FOREIGN PATENT DOCUMENTS

| | | |
|---|---|---|
| DE | 10003140 C1 | 8/2001 |
| DE | 10059794 A1 | 6/2002 |
| DE | 102006007008 A1 | 8/2007 |
| DE | 102007037706 A1 | 2/2009 |
| SE | WO 2010083848 A1 * | 7/2010 ............. F16H 61/24 |

OTHER PUBLICATIONS

English Translation of the Abstract of DE10003140C1—Machine Translation from http:/worldwide.espacenet.com/publicationDetails/.
English Translation of the Abstract of DE10059794A1—Machine Translation from http:/worldwide.espacenet.com/publicationDetails/.
English Translation of the Abstract of DE102006007008A1—Machine Translation from http:/worldwide.espacenet.com/publicationDetails/.
English Translation of the Abstract of DE102007037706A1—Machine Translation from http:/worldwide.espacenet.com/publicationDetails/.

* cited by examiner

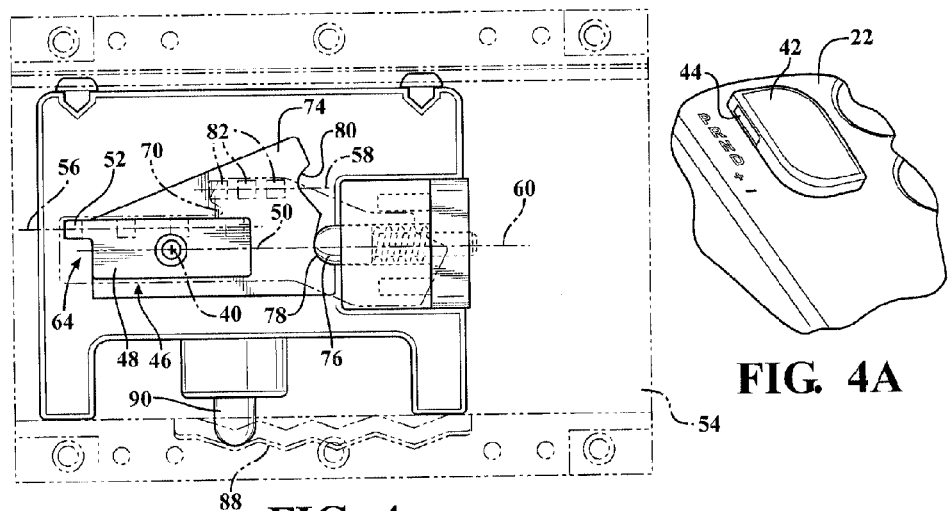
FIG. 4 FIG. 4A
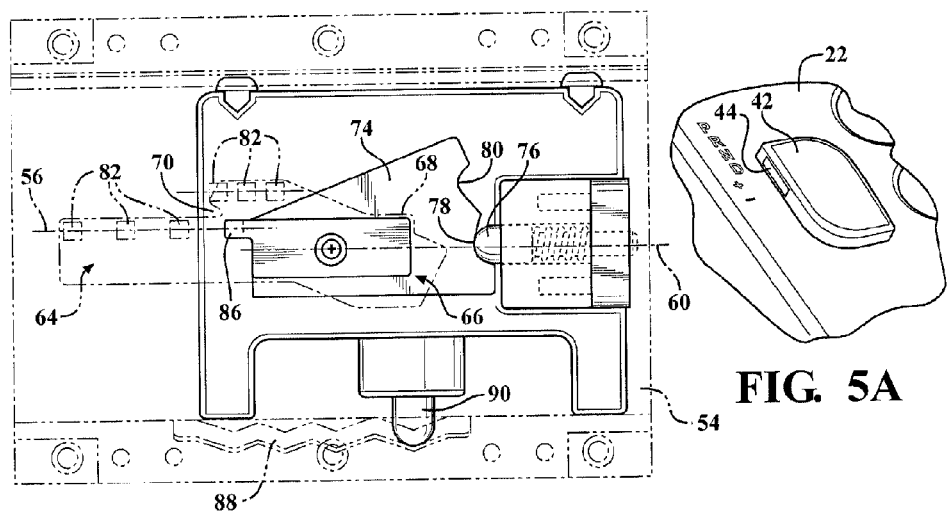
FIG. 5 FIG. 5A

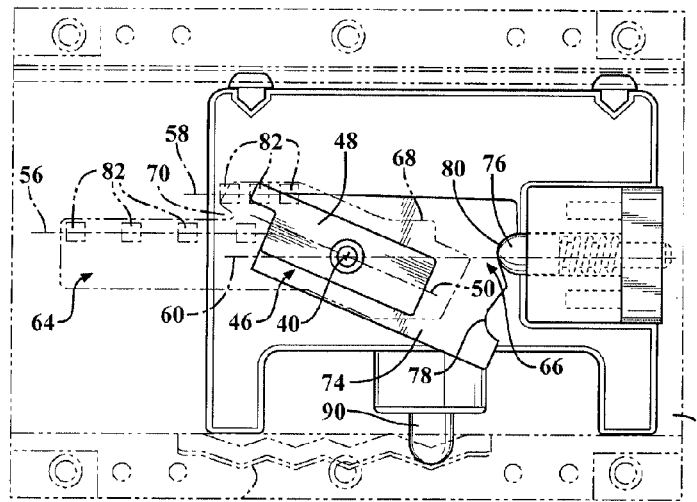
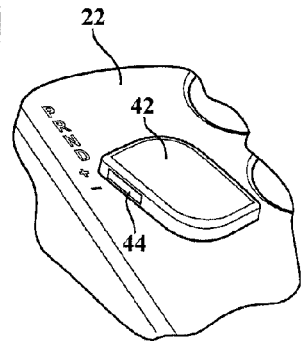
FIG. 6
FIG. 6A
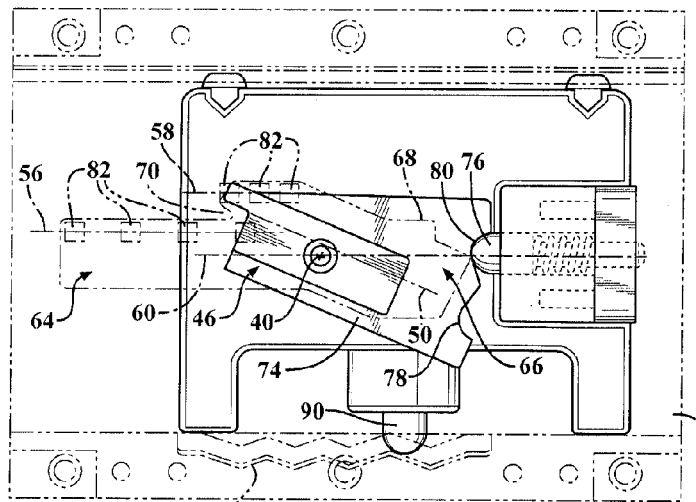
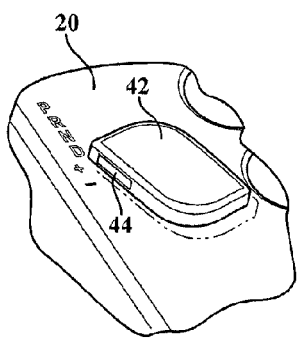
FIG. 7
FIG. 7A

SHIFTER ASSEMBLY

CROSS-REFERENCE TO RELATED APPLICATIONS

This application is the National Stage of International Patent Application No. PCT/IB2011/002762, filed on Nov. 21, 2011, the content of which is incorporated herein by reference.

FIELD OF THE INVENTION

The present invention generally relates to a shifter assembly for changing gear positions in a transmission of a vehicle.

BACKGROUND OF THE INVENTION

Shifter assemblies are used with automatic transmissions in vehicle for changing gear positions of the automatic transmission. For example, the shifter assemblies can be used to shift the automatic transmission into a plurality of automatic modes, such as Park, Reverse, Neutral, and Drive. The shifter assemblies can also be used to shift the automatic transmission into a manual mode akin to a manual transmission. Once in the manual mode, a driver may shift the automatic transmission from gear to gear manually.

A conventional shifter assembly includes a shifter operational along a first path between the plurality of automatic modes. The shifter is then moved into a second path for switching from the automatic mode to the manual mode. Once in the manual mode, the shifter is operational along the second path in a fore to aft manner to change gears within the automatic transmission manually. The second path is typically either parallel to and spaced from the first path or is transverse to the first path. In either case, the shifter must be moved laterally relative to the first path. More specifically, when the second path is parallel to and spaced from the first path, the shifter must be moved laterally though a transverse path to switch from the first path to the second path. When the second path is transverse to the first path, the shifter is moved laterally to complete the manual changes of the gears in the automatic transmission. Requiring lateral movement of the shifter takes up additional space within the vehicle, which is undesirable. Requiring lateral movement of the shifter also results in the shifter assemblies having additional complex components to allow the lateral movement of the shifter while restricting other movements. Therefore, there remains an opportunity to provide an improved shifter assembly.

SUMMARY OF THE INVENTION AND ADVANTAGES

A shifter assembly changes gear positions in a transmission of a vehicle. The shifter assembly includes a housing having an exterior surface and an opposite interior surface. The shifter assembly also includes a shaft extending between a first end and a second end, which is spaced from the first end. The shaft defines a longitudinal axis between the first and second ends of the shaft. The second end of the shaft is movable within the housing. The shifter assembly includes a knob mounted to the first end of the shaft. The knob is disposed adjacent the exterior surface of the housing for moving the shaft within the housing. The shifter assembly includes a selector plate mounted to the second end of the shaft. The selector plate is movable as a unit with the shaft. The shifter assembly includes a guide plate coupled to the housing. The guide plate defines a first path and a second path spaced from the first path. A portion of the selector plate is movable through the first path during an automatic mode for facilitating automatic selection of the gear positions within the transmission. The selector plate is rotatable about the longitudinal axis into a manual mode. In the manual mode, the portion of the selector plate is movable through the second path for permitting manual selection of the gear positions within the transmission. Allowing the manual selection of the gear positions within the transmission by simply rotating the selector plate about the longitudinal axis of the shaft provides for convenient switching between the automatic mode and the manual mode of the transmission.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a bottom view of the shifter assembly showing a selector plate of the shifter assembly in a Park position;

FIG. 4A is a perspective view of a knob of the shifter assembly in the Park position;

FIG. 5 is a bottom view of the shifter assembly showing a selector plate of the shifter assembly in a Drive position;

FIG. 5A is a perspective view of a knob of the shifter assembly in the Drive position;

FIG. 6 is a bottom view of the shifter assembly showing a selector plate of the shifter assembly in a manual mode position;

FIG. 6A is a perspective view of a knob of the shifter assembly in the manual mode position;

FIG. 7 is a bottom view of the shifter assembly showing a selector plate of the shifter assembly in a shift up position;

FIG. 7A is a perspective view of a knob of the shifter assembly in the shift up position;

DETAILED DESCRIPTION OF THE INVENTION

Figure 1:
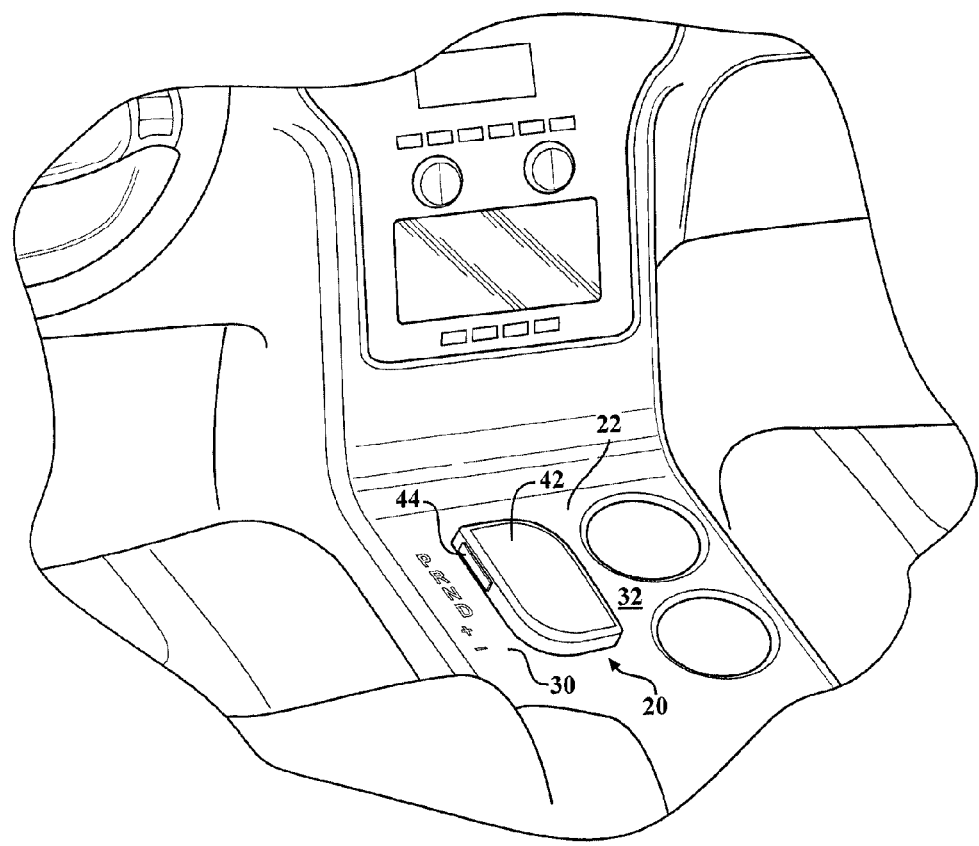
FIG. 1 is a perspective view of a shifter assembly including a knob.

Referring to the Figures, wherein like numerals indicate like or corresponding parts throughout the several views, a shifter assembly is generally shown at 20. Generally, the shifter assembly 20 is operated for selecting gear positions of a transmission for a vehicle. Typically, the shifter assembly 20 is disposed within a center console 22 of the vehicle, as shown in FIG. 1. However, the shifter assembly 20 may be disposed in other places within the vehicle, such as the dashboard or the steering column.

Figure 2:
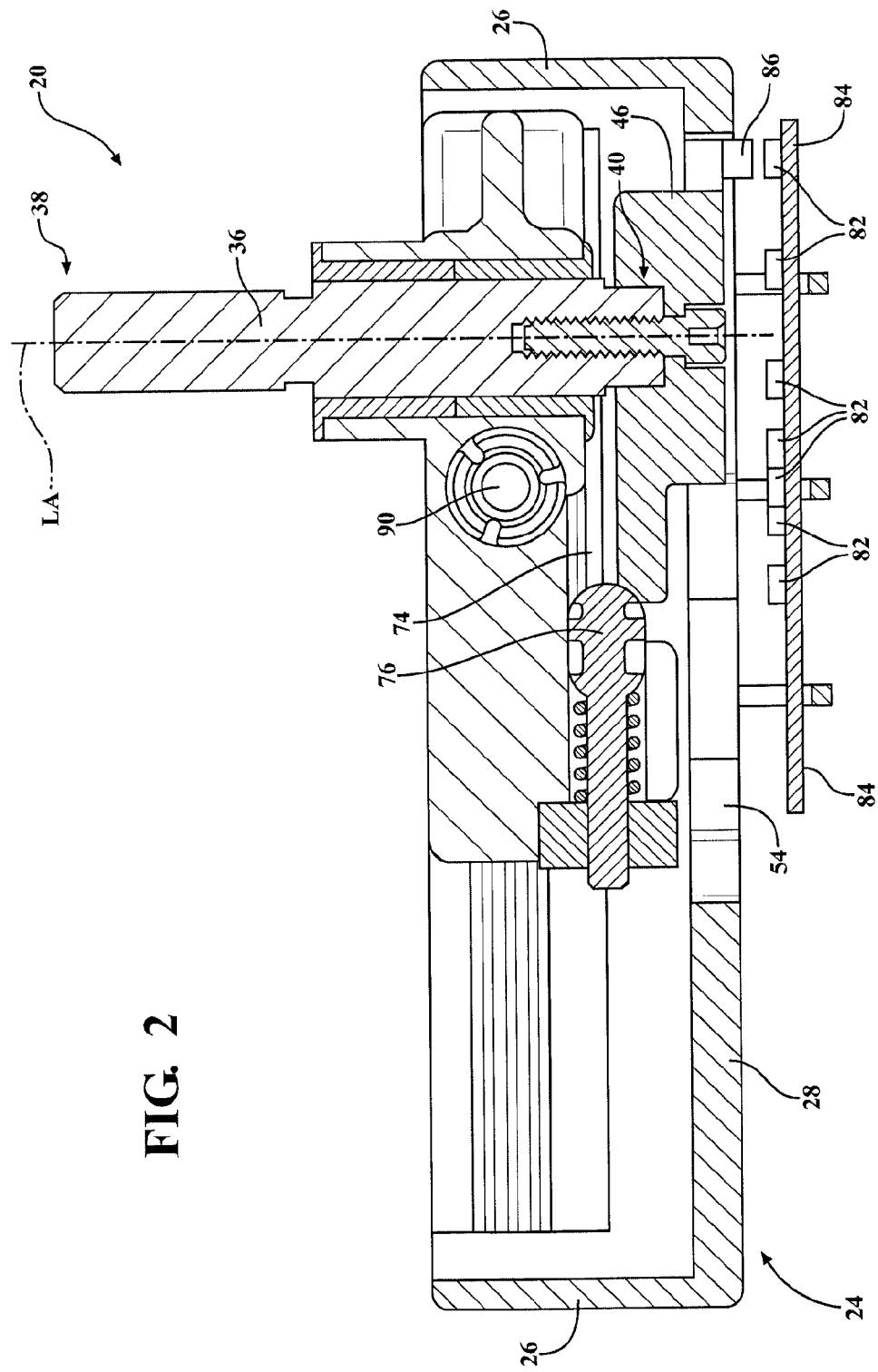
FIG. 2 is a cross-sectional view of the shifter assembly without the knob present.
Figure 3:
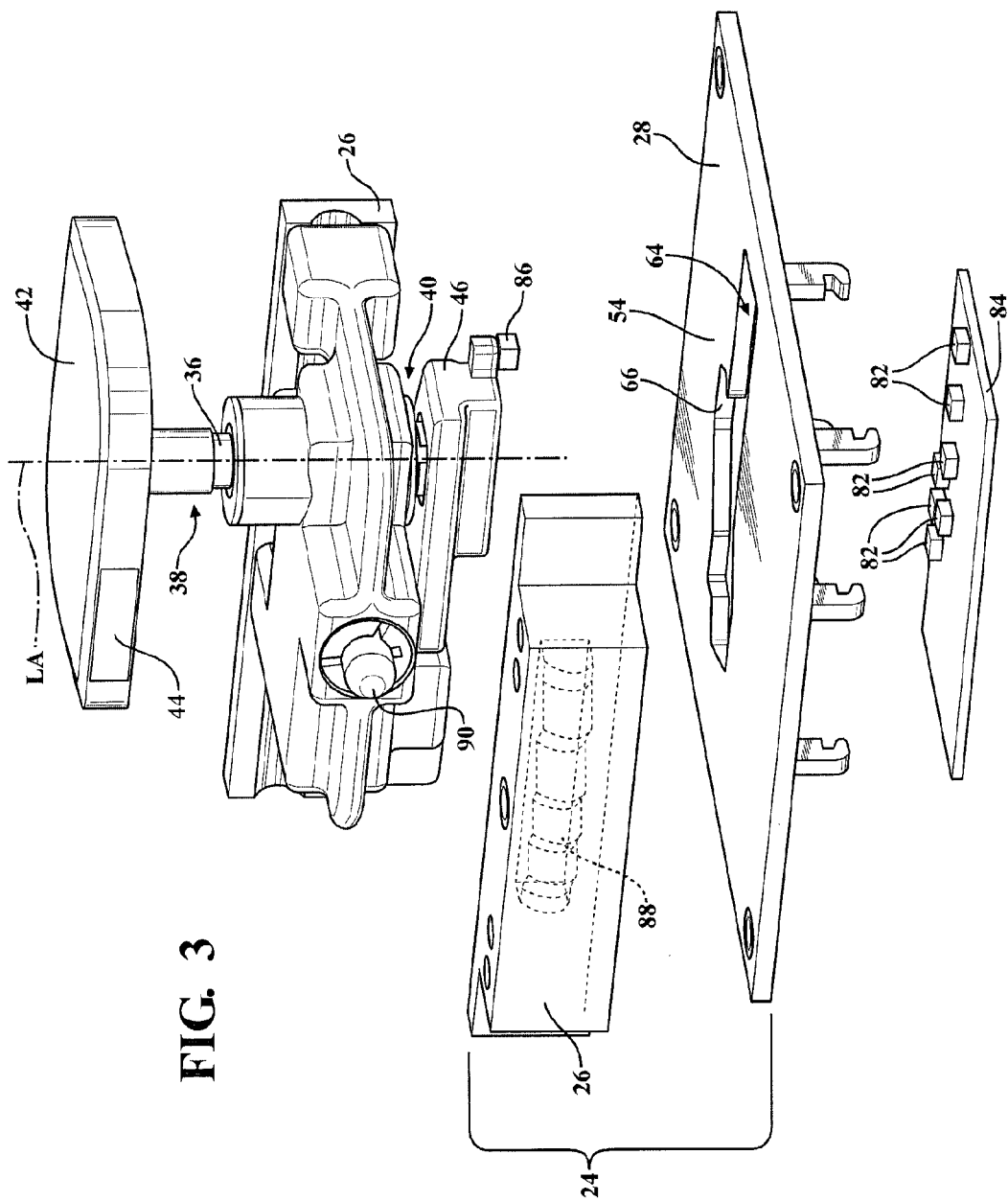
FIG. 3 is an exploded perspective view of the shifter assembly.

With reference to FIGS. 2 and 3, the shifter assembly 20 includes a housing 24 having at least one side member 26 and a bottom portion 28. The housing 24 may also have a top portion 30 although the top portion 30 is not required. It is to be appreciated that the center console 22 may be the top portion 30 of the housing 24. The housing 24 has an exterior surface 32 and an opposite interior surface. Generally, the exterior surface 32 of the housing 24 is the center console 22 of the vehicle.

The shifter assembly 20 includes a shaft 36 extending between a first end 38 and a second end 40, which is spaced from the first end 38. The shaft 36 defines a longitudinal axis LA between the first end 38 and the second end 40 of the shaft. The shaft 36 extends through the housing 24 such that the first end 38 of the shaft 36 is exposed within the interior of the vehicle, as shown in FIG. 1. The second end 40 of the shaft 36 is disposed within the housing 24 and is movable within the housing 24. A vehicle operator utilizes the first end 38 of the shaft 36 to move the second end 40 of the shaft 36. The movement of the shaft 36 will be described in detail below.

The shifter assembly 20 also includes a knob 42 mounted to the first end 38 of the shaft 36 and disposed adjacent the exterior surface of the housing 24. The knob 42 allows the second end 40 of the shaft 36 to be moved within the housing 24. More specifically, the vehicle operator manipulates the knob 42 to move the second end 40 of the shaft 36 within the housing 24. Said differently, movement of the knob 42 results in a corresponding movement of the second end 40 of the shaft 36. The knob 42 includes a release button 44, which must be depressed prior to moving the knob 42. Said differently, the knob 42 and therefore the shaft 36 will not move unless the release button 44 is depressed.

With reference to FIG. 4, the shifter assembly 20 includes a selector plate 46 mounted to the second end 40 of the shaft 36. The selector plate 46 is movable as a unit with the shaft 36. Said differently, movement of the knob 42 results in a corresponding movement of the selector plate 46, which is coupled to the shaft 36. The selector plate 46 has a rectangular body 48. The second end 40 of the shaft 36 is connected to the rectangular body 48 of the selector plate 46 along a centerline 50 of the selector plate 46. A finger 52 extends from the body. The finger 52 is offset from the centerline 50 of the selector plate 46, as will be described in greater detail below.

The shifter assembly 20 includes a guide plate 54 coupled to the housing 24. The guide plate 54 may be the bottom portion 28 of the housing 24. The guide plate 54 defines a first path 56 and a second path 58 spaced from the first path 56. Typically, the first path 56 and the second path 58 are parallel with each other. The first path 56 and the second path 58 are defined in a common plane such that the first path 56 and the second path 58 are coplanar with each other.

As introduced above, the second end 40 of the shaft 36 is moveable within the housing 24. For example, the second end 40 of the shaft 36 is movable along a plate axis 60. The plate axis 60 is defined along the guide plate 54. The plate axis 60 is typically adjacent the first path 56. As such, the selector plate 46 also moves along the plate axis 60. A portion of the selector plate 46 is movable through the first path 56 and the second path 58 by movement of the selector plate 46 along the plate axis 60. For example, the knob 42 may be grasped by a vehicle operator to move the knob 42 and, therefore, the shaft 36 and selector plate 46 through the first path 56. More specifically, the finger 52 of the selector plate 46 is movable through the first path 56 and the second path 58 by movement of the selector plate 46 along the plate axis 60 such that the selector plate 46 is lineally moveable along the first and second paths. Typically, the first path 56 is spaced from and parallel to the plate axis 60. More typically, both the first path 56 and the second path 58 are spaced from and parallel to the plate axis 60. Therefore, the finger 52 of the selector plate 46 is offset from to centerline 50 of the selector plate 46 such that the finger 52 is aligned with the first path 56.

The portion of the selector plate 46 is movable through the first path 56 during an automatic mode for facilitating automatic selection of the gear positions within the transmission. Additionally, the selector plate 46 is rotatable about the longitudinal axis LA of the shaft 36 into a manual mode with the portion of the selector plate 46 movable through the second path 58 in the manual mode for permitting manual selection of the gear positions within the transmission. It is to be appreciated that the rotation of the selector plate 46 may be independent of the shaft 36 such that the shaft 36 does not rotate as the selector plate 46 rotates about the longitudinal axis LA. Alternatively, the rotation of the selector plate 46 may be caused by the rotation of the shaft 36. The portion of the selector plate 46, and, more specifically, the finger 52 of the selector plate 46 is movable through the first path 56 between a plurality of automatic transmission gear positions when in the automatic mode and the portion of the selector plate 46 is movable through a plurality of manual transmission gear positions when in the manual mode. The second end 40 of the shaft 36 moves along the plate axis 60 as the selector plate 46 is moved along the first path and the second path. The plate axis 60 is aligned with the centerline 50 of the selector plate 46 when the selector plate 46 is in the automatic mode. The rotation of the selector plate 46 from the automatic mode to the manual mode brings the centerline 50 of the selector plate 46 out of alignment with the plate axis 60. Although the centerline 50 of the selector plate 46 is out of alignment with the plate axis 60, the second end 40 of the shaft 36 and the selector plate 46 still move along the plate axis 60.

It is to be appreciated that the selector plate 46 may only rotate and movement of the portion of the selector plate 46 through the first and second paths 58, 60 occurs by rotation of the knob 42. Said differently, the knob 42 may be rotated to rotate the shaft 36 and the selector plate 46 to switch between the plurality of automatic transmission gear positions and further rotated to rotate the selector plate 46 into the manual mode and move the portion of the selector plate 46 through the second path 58.

The guide plate 54 may define a first channel 64 with the selector plate 46 disposed within and movable through the first channel 64 for guiding the portion of the selector plate 46 through the first path 56. The guide plate 54 may also define a second channel 66 in communication with the first channel 64. The second channel 66 is in communication with the first channel 64 for allowing the selector plate 46 to rotate about the longitudinal axis LA of the shaft 36 to allow the portion of the selector plate 46 to enter the second path 58 in the manual mode. The first channel 64 includes a stop notch 68 for receiving the rectangular body 48 of the selector plate 46 to limit movement of the selector plate 46 along the first channel 64. The stop notch 68 is configured to only allow the selector plate 46 to rotate in a single direction, i.e., the selector plate 46 can only rotate counter clockwise from the automatic mode to the manual mode.

A lip 70 extends into the first and second channels 64, 66 and separates a portion of the first and second channels 64, 66 opposite the stop notch 68. The lip 70 prevents the finger 52 of the selector plate 46 from rotating between the automatic mode and the manual mode as the selector plate 46 moves through the first channel 64 and the second channel 66.

In operation, the selector plate 46 moves through the first path 56 between the plurality of automatic gear positions, such as Park (P), Reverse (R), Neutral (N), and Drive (D). In any of these automatic gear positions, the transmission of the vehicle operates similar to automatic transmissions. The selector plate 46 is shown in the Park position (P) in FIG. 4 and the knob 42 is shown in Park position (P) in FIG. 4A. The selector plate 46 is shown in the Drive position (D) in FIG. 5. When the selector plate 46 is in the Drive position (D), the knob 42 can be rotated to enter the manual mode with the portion of the selector plate 46 switching from the first path 56 to the second path 58. The selector plate 46 is shown in the manual mode in FIG. 6. The knob 42 is also shown in the manual mode in FIG. 6A. The plurality of manual transmission gear positions includes a shift up position (+), a shift down position (−), and a shift neutral position (M). Once the finger 52 of the selector plate 46 is in the Drive position (D), the finger 52 of the selector plate 46 has clearance to rotate past the lip 70 and enter the second path 58. As the knob 42 is rotated from the automatic mode to the manual mode, the portion of the selector plate 46 moves from the Drive position (D) of the automatic mode to the shift neutral position (M) of the manual mode as shown in FIG. 6. In the shift neutral position (M), the transmission operates similar to manual transmissions and gear changes in the transmission are generally only effectuated by a vehicle operator. Of course, certain parameters can be included with the transmission to override the manual mode selection to prevent damage to the transmission by driving the vehicle in the incorrect gear, i.e., parameters that prevent the transmission from being switched in to the Reverse position (R) while driving the vehicle.

Figure 8:
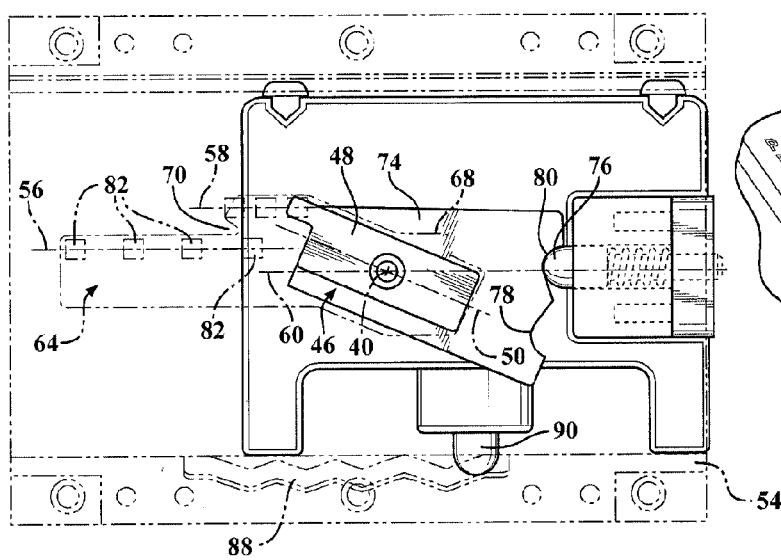
FIG. 8 is a bottom view of the shifter assembly showing a selector plate of the shifter assembly in a shift down position.
Figure 8A:
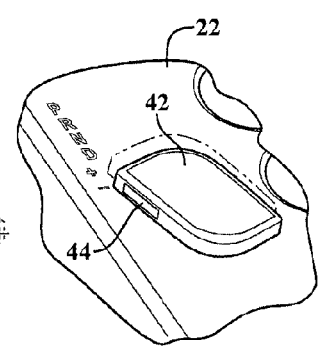
FIG. 8A is a perspective view of a knob of the shifter assembly in the shift down position.

Once the portion of the selector plate 46 is in the shift neutral position (M), the vehicle operator may move the knob 42 in a fore and aft operation between the shift up position (+) and the shift down position (−), respectively, as shown in FIGS. 7-8A. The lip 70 prevents the selector plate 46 from being inadvertently rotated from the manual mode to the automatic mode when the finger 52 is moved into the shift up position (+). It is to be appreciated that the knob 42 may be moved in other directions to effectuate the movement of the selector plate 46 into the shift up position (+) and the shift down position (−). As will be described in detail below, the selector plate 46 is spring biased to return to the shift neutral position (M) after the knob 42 is moved to either the shift up position (+) or the shift down position (−). The vehicle operator may return to the automatic mode by rotating the knob 42 to move the selector plate 46 back into the Drive position (D) of the first path 56.

The shifter assembly 20 may include a mode retention device. The mode retention device is coupled to the shaft 36 such that the mode retention device moves with the selector plate 46. However, the mode retention device may be coupled to the housing 24. The mode retention device is aligned with the plate axis 60 for holding the selector plate 48 in either the automatic mode or the manual mode. The mode retention device includes a mode retaining plate 74 coupled to either the shaft 36 or the selector plate 46 such that the mode retaining plate 74 moves with the selector plate 46. The mode retaining plate 74 defines an automatic mode detent 78 and a manual mode detent 80. The detents 78, 80 of the mode retaining plate 74 engage a retaining pin 76 when the selector plate 46 is in either of the automatic or manual modes for providing a tactile indication that the selector plate 46 is properly rotated between the first path 56 and the second path 58.

The shifter assembly 20 is intended to work with suitable sensors, which are responsive to a positioning of the selector plate 46 to generate signals for application to a transmission controller. The transmission controller includes a known processing logic circuit which is utilized for effecting gear shifts within the transmission in a known manner. It is to be appreciated that the transmission controller may be in communication with other components of the vehicle, such as the brake pedal for determining if the brake pedal is depressed before allowing the transmission to be shifted from park.

As best shown in FIGS. 2 and 3, the shifter assembly 20 includes a plurality of sensors 82 corresponding to a respective one of the plurality of automatic transmission gear positions and a respective one of the plurality of manual transmission gear positions for determining a location of the selector plate 46. A sensor plate 84 is spaced below the selector plate 46 with the plurality of sensors 82 disposed on the sensor plate 84. The sensor plate 84 is parallel to the selector plate 46. A position indicator 86 is disposed on the portion of the selector plate 46 that moves through the first and second paths 58, 60. The position indicator 86 is aligned with one of the plurality of sensors 82 in each of the plurality of automatic transmission gear positions and each of the manual transmission gear positions. The position indicator 86 emits a signal, such as a magnetic field. The plurality of sensors 82 identifying the presence of the signal produced by the position indicator 86 when the position indictor is aligned with one of the plurality of sensors 82 to identify the location of the selector plate 46. Alternatively, the plurality of sensors 82 may emit the signal and the position indicator 86 identifies the presence of the signal emitted by the sensors 82 to identify the location of the selector plate 46. Once identified, the location of the selector plate 46 can then be relayed to the transmission or a component thereof such as the transmission controller. Once the location of the selector plate 46 is relayed to the transmission, actual shifting of the gears in the transmission can be achieve by any known method.

As best shown in FIGS. 2 and 4, the shifter assembly 20 includes a plurality of positioning detents 88, which provide motion-locking points for the selector plate 46 corresponding to one of the automatic transmission gear positions. The positioning detents 88 may be defined by the housing 24, and, more specifically, the side member 26 of the housing 24 with each of the positioning detents 88 corresponding to one of the plurality of automatic transmission gear positions. Generally, each of the positioning detents 88 are defined between a pair of thresholds with a seating surface defined between the thresholds. Generally, the seating surface corresponds to the deepest part of each of the positioning detents 88 and the thresholds correspond to the shallowest part of the positioning detents 88. An angled surface may be disposed between the thresholds and the seating surface.

A position retention device 90 is coupled to the shaft 36 and engages the positioning detents 88 for providing a tactile indication that the position indication is aligned with one of the plurality of sensors 82. The position retention device 90 engages the seating surface of the positioning detents 88 in each of the automatic transmission gear positions. The position retention device 90 may be a spring loaded pin. The spring loaded pin extends from the shaft 36 to engage with the seating surface of the positioning detents 88. The spring loaded pin slides along the seating surface and the angled surface of one of the positioning detents 88 until the spring loaded pin overcomes the threshold and enters another one of the positioning detents 88. The selector plate 46 moves freely through the position detents 88 with resistance provided by the spring loaded pin for tactical indication of the position of the selector plate 46 relative to the positioning detents 88. However, movement of the selector plate 46 may be limited by adding a locking element to the spring loaded pin. The locking element prevents biasing of the spring loaded pin and therefore prevent the spring loaded pin from moving along the angled surface of the positioning detents 88. The locking element may be withdrawn from engagement with the spring loaded pin by depressing the release button 44 on the knob 42 thereby allowing the spring loaded pin to move about the automatic transmission gear positions. Because the spring loaded pin and the selector plate 46 are coupled to the shaft 36, movement of the selector plate 46 can be limited by limiting the movement of the spring loaded pin.

As alluded to above, the selector plate 46 is spring biased to return to the shift neutral position (M) after the knob 42 is moved to either the shift up position (+) or the shift down position (−). More specifically, the spring bias is provided by the interaction of position retention device 90 with the position detent 88 corresponding to the Drive position (D). As the selector plate is moved from the shift neutral position (M) to either the shift up position (+) or the shift down position (−), the retention device 90 travels along the angled surface of one of the positioning detents 88, but does overcome the threshold of the position detents 88. Because the retention device 90 does not overcome the threshold of the position detent 88 corresponding to the Drive position (D), the force of the spring loaded pin acting against the angled surface of the positioning detents 88 returns the spring loaded pin and thus the selector plate 46 back to the seating surface of the shift neutral position (M).

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A shifter assembly for selecting gear positions of a transmission for a vehicle, said shifter assembly comprising:
    a housing having an exterior surface and an opposite interior surface;
    a shaft extending between a first end and a second end spaced from said first end with said second end of said shaft movable within said housing and with said shaft defining a longitudinal axis between said first and second ends,
    a knob mounted to said first end of said shaft and disposed adjacent said exterior surface of said housing for moving said shaft within said housing, and
    a selector plate mounted to said second end of said shaft with said selector plate movable as a unit with said shaft; and
    a guide plate coupled to said housing and defining a first path and a second path spaced from said first path with a portion of said selector plate movable through said first path during an automatic mode for facilitating automatic selection of the gear positions within the transmission and said selector plate being rotatable about said longitudinal axis into a manual mode with said portion of said selector plate movable through said second path in said manual mode parallel to said first path for permitting manual selection of the gear positions within the transmission.

2. The shifter assembly as set forth in claim 1 wherein said selector plate is moveable linearly along both of said first and second paths with said selector plate rotatable about said longitudinal axis between said first and second paths.

3. The shifter assembly as set forth in claim 1 wherein said guide plate defines a first channel with said selector plate disposed within and movable through said first channel for guiding said portion of said selector plate through said first path.

4. The shifter assembly as set forth in claim 3 wherein said guide plate defines a second channel in communication with said first channel for allowing said selector plate to rotate about said longitudinal axis to allow said portion of said selector plate to enter said second path in said manual mode.

5. The shifter assembly as set forth in claim 4 wherein said second end of said shaft is movable along a plate axis and said selector plate is movable through said first and second paths by movement of said shaft along said plate axis.

6. The shifter assembly as set forth in claim 5 wherein each of said first path, said second path, and said plate axis are parallel to each other.

7. The shifter assembly as set forth in claim 5 further comprising a mode retention device coupled to said housing and aligned with said plate axis for holding said selector plate in said modes.

8. The shifter assembly as set forth in claim 7 further comprising a mode retaining plate defining an automatic mode detent and a manual mode detent with said mode retaining plate coupled to either said shaft or said selector plate such that said mode retaining plate moves with said selector plate and with said detents of said mode retaining plate engaging said mode retention device when in said automatic and manual modes for providing a tactile indication that said selector plate is properly rotated between said first path and said second path.

9. The shifter assembly as set forth in claim 4 wherein said selector plate has a rectangular body and a finger extending from said body with said finger defining said portion of said selector plate moving through said first and second paths.

10. The shifter assembly as set forth in claim 9 wherein said first channel includes a stop notch for receiving said rectangular body of said selector plate to limit movement of said selector plate along said first channel.

11. The shifter assembly as set forth in claim 10 further comprising a lip separating a portion of said first channel and a portion of said second channel opposite said stop notch for preventing said finger of said selector plate from rotating between said automatic mode and said manual mode as said selector plate moves through said first channel and said second channel.

12. The shifter assembly as set forth in claim 1 wherein said first path and said second path are defined in a common plane such that said first path and said second path are coplanar with each other and said selector plate is movable along said common plane though said first and second paths.

13. The shifter assembly as set forth in claim 1 wherein said portion of said selector plate is movable through said first path between a plurality of automatic transmission gear positions when in said automatic mode and said portion of said selector plate is movable through a plurality of manual transmission gear positions when in said manual mode.

14. The shifter assembly as set forth in claim 13 further comprising a plurality of sensors, with each of said sensors individually corresponding with each of said plurality of automatic transmission gear positions and said plurality of manual transmission gear positions for determining a location of said selector plate to relay the location of said selector plate to the transmission.

15. The shifter assembly as set forth in claim 14 further comprising a position indicator disposed on said portion of said selector plate wherein said position indicator is aligned with one of said plurality of sensors in each of said plurality of automatic transmission gear positions and each of said manual transmission gear positions.

16. The shifter assembly as set forth in claim 15 wherein said position indicator produces a magnetic field and wherein said plurality of sensors identify said magnetic field produced by said position indicator when said position indictor is aligned with one of said plurality of sensors.

17. The shifter assembly as set forth in claim 16 further comprising a sensor plate spaced below said selector plate with said plurality of sensors disposed on said sensor plate.

18. The shifter assembly as set forth in claim 13 further comprising a plurality of positioning detents with each of said positioning detents corresponding to one of said plurality of automatic transmission gear positions.

19. The shifter assembly as set forth in claim 18 further comprising a position retention device coupled to said shaft and engaging said positioning detents for providing a tactile indication that said position retention device is aligned with one of said plurality of sensors.

20. A shifter assembly for selecting gear positions of a transmission for a vehicle, said shifter assembly comprising:
 a housing having an exterior surface and an opposite interior surface;
 a shaft extending between a first end and a second end spaced from said first end with said second end of said shaft movable within said housing and with said shaft defining a longitudinal axis between said first and second ends,
 a knob mounted to said first end of said shaft and disposed adjacent said exterior surface of said housing for moving said shaft within said housing, and
 a selector plate mounted to said second end of said shaft with said selector plate movable as a unit with said shaft; and
 a guide plate coupled to said housing defining a plate axis transverse to said longitudinal axis with said plate axis and said longitudinal axis defining an angle therebetween, with said guide plate defining a first path and a second path spaced from said first path with a portion of said selector plate movable through said first path during an automatic mode for facilitating automatic selection of the gear positions within the transmission and said selector plate being rotatable about said longitudinal axis into a manual mode with said portion of said selector plate movable through said second path in said manual mode for permitting manual selection of the gear positions within the transmission;
 wherein said shaft is movable along said plate axis in unison with said selector plate moving through said first and second paths, with said angle between said plate axis and said longitudinal axis defined by said shaft remaining constant as said shaft moves along said plate axis.

* * * * *